United States Patent
Needham et al.

(10) Patent No.: US 6,970,926 B1
(45) Date of Patent: Nov. 29, 2005

(54) DISPATCH CALL SERVER IN A PACKET BASED COMMUNICATION NETWORK

(75) Inventors: Michael L. Needham, Palatine, IL (US); Guy G. Romano, Elmhurst, IL (US)

(73) Assignee: Motorola, Inc., Schaumburg, IL (US)

( * ) Notice: Subject to any disclaimer, the term of this patent is extended or adjusted under 35 U.S.C. 154(b) by 763 days.

(21) Appl. No.: 09/678,056

(22) Filed: Oct. 3, 2000

(51) Int. Cl.[7] ............................................. G06F 15/173
(52) U.S. Cl. .................. 709/225; 709/204; 709/238; 370/312; 370/390; 455/426.1; 455/466; 455/512
(58) Field of Search ................................ 709/204–205, 709/225, 238; 455/426.1, 466, 512, 421; 370/390, 312

(56) References Cited

U.S. PATENT DOCUMENTS

| | | | |
|---|---|---|---|
| 4,012,597 A | * | 3/1977 | Lynk, Jr. et al. ............. 455/512 |
| 5,434,797 A | * | 7/1995 | Barris ........................ 709/204 |
| 5,594,948 A | | 1/1997 | Talarmo et al. |
| 5,659,881 A | | 8/1997 | Kent |
| 5,717,830 A | * | 2/1998 | Sigler et al. ............. 455/426.1 |
| 5,974,446 A | | 10/1999 | Sonnenreich et al. |
| 6,298,058 B1 | * | 10/2001 | Maher et al. ................ 370/390 |
| 6,298,239 B1 | * | 10/2001 | Yonemoto et al. .......... 455/466 |
| 6,304,558 B1 | * | 10/2001 | Mysore ....................... 370/312 |
| 6,466,550 B1 | * | 10/2002 | Foster et al. ................. 370/261 |
| 6,477,150 B1 | * | 11/2002 | Maggenti et al. ............ 370/312 |
| 6,678,281 B1 | * | 1/2004 | Chakrabarti et al. ........ 370/438 |

* cited by examiner

*Primary Examiner*—Wen-Tai Lin
(74) *Attorney, Agent, or Firm*—Steven R. Santema; Jeffrey K. Jacobs

(57) ABSTRACT

A dispatch server (206) is provided in a packet based dispatch radio network to serve as coordinator and arbitrator for dispatch group calls. Participants in a group call transmit internet protocol (IP) voice packets to the server in unicast fashion. The server receives voice packets from multiple sources (210, 216) and implements a prioritization scheme to select one source to pass on to the group via IP multicast. Various prioritization techniques are described.

19 Claims, 4 Drawing Sheets

- PRIOR ART -

DISPATCH CALL SERVER IN A PACKET BASED COMMUNICATION NETWORK

BACKGROUND OF THE INVENTION

The present invention relates generally to networks for communication of data and voice information. More particularly, the present invention relates to a dispatch call server and its use in a packet based communication network.

Dispatch communication networks including dispatch radio systems have been developed to provide two way and group calling in a radio system. Dispatch communication systems have several identifying characteristics. First, they provide talking on demand. A user who wants to communicate to another user activates a radio and begins speaking. This concept is broadly known as push to talk (PTT). Second, a dispatch communication network provides for group calling. A user can have a two-way conversation with another user or can select a group of users for a multi-party conversation. Third, dispatch radio links are one-way (also referred to as simplex or half duplex) in nature. A user cannot talk and listen at the same time. A channel is seized by the user's radio when a PTT button on the radio is pressed and while the user is talking. The channel is then released by the radio when talking stops or when the PTT button is released. Dispatch radio networks have been developed using both analog and digital radio technologies.

Generally, dispatch networks typically include a central controller which manages the various radio links in the system. The controller assigns channels and arbitrates between callers in the system. That is, in a two-way call, only one speaker can talk at a time because a dispatch network is limited to one-way communication. Also, in a group call, only one speaker can talk at a time so listeners don't hear two talkers at the same time. The controller operation is typically optimized to minimize response time, so that conversations in the network can progress with minimal delay or interference, even during heavy demand on the network.

In wireline or wireless systems, it is known to use packet based data networks to provide voice services. Various voice over internet protocol (VoIP) techniques have been developed for voice communication in such a network. An internet protocol session is set up between the communicating parties and voice packets are exchanged.

The Internet Protocol (IP) is designed for use in interconnected systems of packet-switched computer communication networks. The internet protocol provides for transmitting blocks of data called datagrams from sources to destinations, where sources and destinations are hosts identified by fixed length addresses. The internet protocol also provides for fragmentation and reassembly of long datagrams, if necessary, for transmission through "small packet" networks.

The internet protocol implements two basic functions, addressing and fragmentation. The internet elements use the addresses carried in the IP header to transmit internet datagrams toward their destinations. The selection of a path for transmission is called routing. The internet routers use fields in the internet header to fragment and reassemble internet datagrams when necessary for transmission through "small packet" networks.

It is desirable to adapt dispatch communication technology to IP and other packet switched network technology to enhance the flexibility of dispatch technology. Dispatch systems have a central controller to perform arbitration between multiple talkers. That is, the talking party of the group must complete his transmission before another group member can join in. However, in an uncoordinated, distributed network used for IP data, there is no way to arbitrate between contending transmissions.

Accordingly, there is a need for a method and apparatus for coordinating dispatch calls in a packet based network.

DETAILED DESCRIPTION OF THE PRESENTLY PREFERRED EMBODIMENTS

Figure 1:
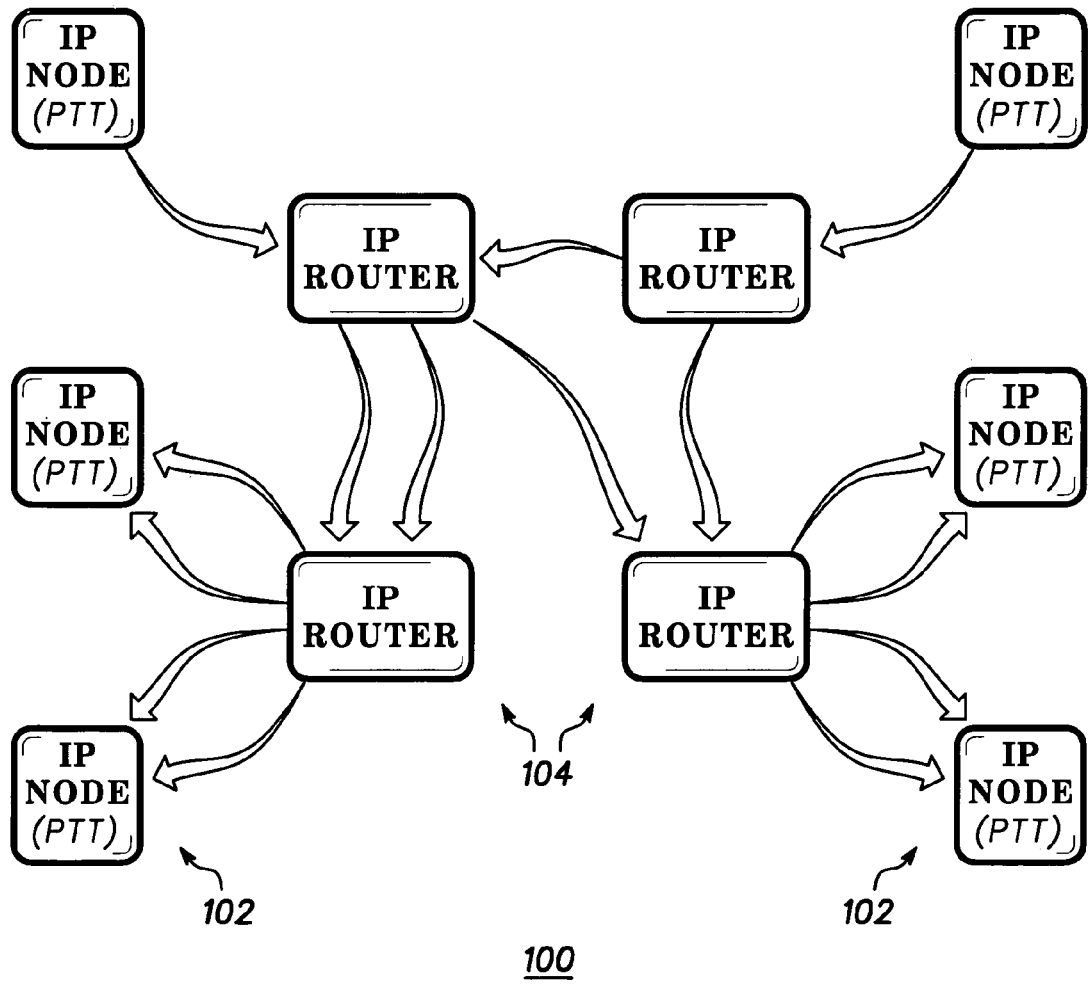
FIG. 1 is a block diagram of a prior art packet based data communication network.

FIG. 1 is a block diagram of a conventional packet based data communication network 100 using internet protocol (IP) for data communication. The network 100 includes a plurality of hosts 102 and routers 104. The network 100 implements a dispatch communication network connecting two or more of the hosts 102 via routers 104.

Each host 102 is any computer or communication device that has full two-way access to other hosts in the network 100. The links between each host in FIG. 2 and any adjacent host are two-way links providing two-way data communication. Each host 102 has a specific local or host number that, together with a network number, forms its unique internet protocol address. In the dispatch radio network 100 of FIG. 1, each host 102 is a communication unit of the network 100. Each host 102 may be a fixed, mobile or portable radio or other device providing wireless or wireline communication with the network 100. In the illustrated embodiment of FIG. 1, the hosts 102 are designated as push-to-talk (PTT) communication devices. However, it will be appreciated that any suitable wireless or wireline communication device may be used for communicating with one or more routers using internet protocol (IP).

The internet protocol (IP) is a method or protocol by which data is sent from one computer or network device to another on the internet or another network, such as the dispatch radio network 100. Each computer or device on the network has an address that uniquely identifies it from all other devices on the network. When data is transmitted, the message is divided into packets.

In the network 100, each packet contains both the sender's network address and the receiver's network address. Each packet is sent to an IP router 104 which understands the topology of the network 100. The router 104 reads the destination address and forwards the packet to an adjacent router 104 that in turn reads the destination address until a router 104 recognizes the packet as belonging to a destination host within its immediate domain. That router 104 then forwards the packet to the intended host 102. The internet protocol delivers the packets.

The routers 104 are specialized or general purpose computing devices configured to receive transmissions from another host in the network 100 for relay to another router or another host in the network 100. The routers 104 respond to addressing information in the IP packets received from other transmitters in the system to properly route the packets to their intended destination.

In the network 100, in accordance with internet protocol, two types of data communication are indicated. These are unicast and multicast. Unicast is communication between a single sender and a single receiver over a network. Multicast is communication between a single sender and multiple receivers on a network. Each type of data communication is controlled and indicated by the addressing information included in the packets of data transmitted in the network 100. For a unicast message, the address of the packet indicates a single receiver. For a multicast communication, the address of the packet indicates a multicast address. The multicast address includes 28 or more bits defining the address of the multicast group for which the packet is intended. All hosts designated to receive a multicast communication are members of the same multicast group. This insures that any multicast communication is transmitted to those and only those hosts.

In the dispatch radio network 100, point to point communication is possible using IP unicast techniques. One host 102 may communicate data, including data representative of voice information, to another host 102 using internet protocol. Voice information is digitized and packetized and transmitted using unicast communication to an appropriate router 104. The router, in conjunction with other routers 104, conveys the packet to the destination address, another host 102 in the network 100. The packet is reassembled with other packets if necessary and the digital data is used to form sound representative of speech. Data may be transmitted over the network 100 in the same manner, without the speech encoding/decoding operation. Further, IP multicast allows for the distribution of IP packets from a single source to multiple destinations, based on a single multicast address assigned to the group. Routers 104 supporting multicast provide replication of packets when needed to deliver packets to all multicast group members.

However, the network 100 is not suited to a dispatch call. In a dispatch two-way call, only one speaker can talk at a time because of the one way nature of dispatch. In a dispatch group call, one speaker speaks to several listeners simultaneously. Different speakers may speak in turn. In a dispatch group call, the source of the multicast voice packets changes as different speakers transmit. Without some means of arbitration, there may be cases where two or more group members decide to transmit at the same time. This would cause group members to simultaneously receive voice packets from multiple sources. The receiver may be able to sort the packets based on the source address and pick only one to listen too, but then different parties might hear different audio and the sender doesn't know who heard what.

Figure 2:
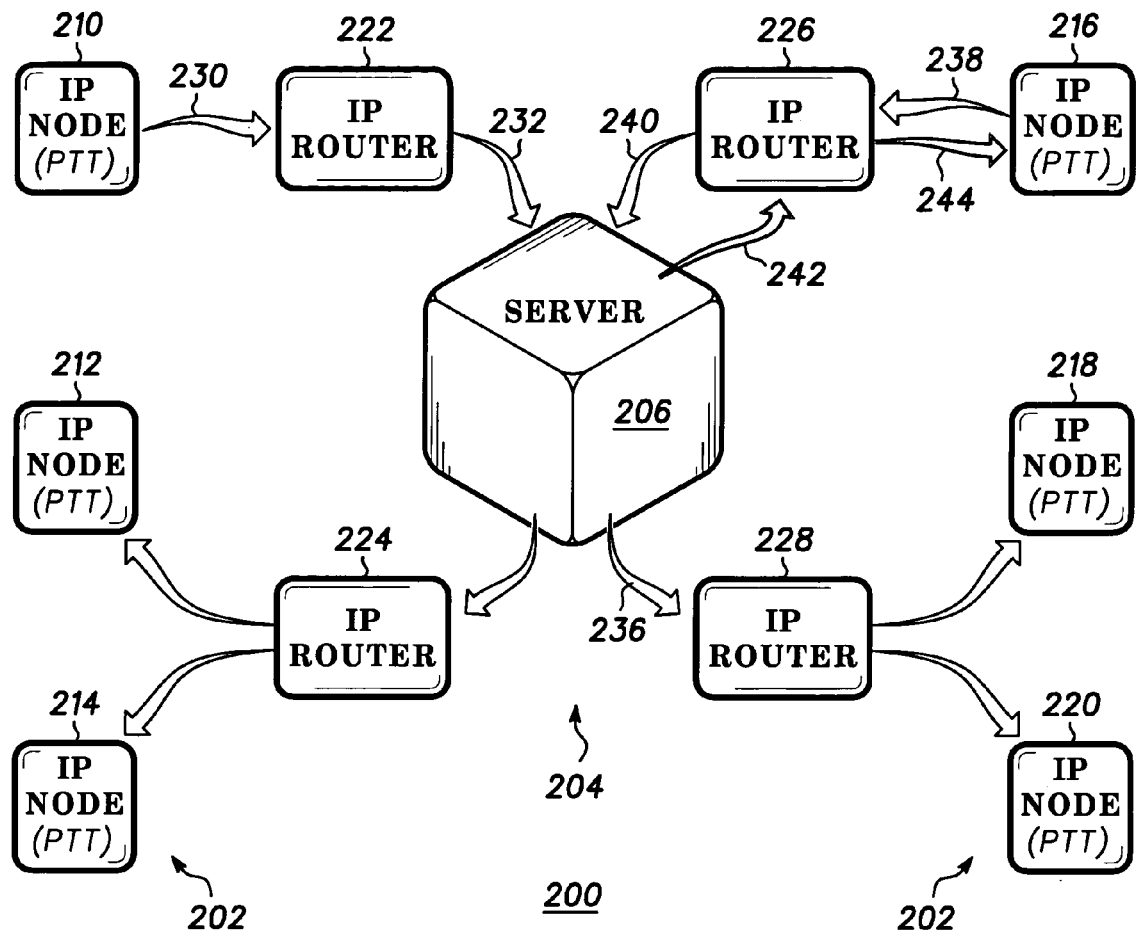
FIG. 2 is a block diagram of a packet based dispatch radio network.

FIG. 2 is a block diagram of a packet based dispatch radio network 200. The network 200 includes a plurality of hosts 202, a plurality of routers 204 and a dispatch call server 206. The network 200 implements a dispatch radio system, including group calling, using internet protocol or other standardized digital communication.

The hosts 202, including a host 210, host 212, host 214, host 216, host 218 and host 220 may be any computer or other device having full two-way access to other devices on the network 200. In the illustrated embodiment of FIG. 2, the hosts 202 are fixed, mobile or portable hosts capable of two-way communication with a remote host. The hosts can be radio or wireline hosts. The wireless or wireline hosts are of the type conventionally known as push-to-talk (PTT). Such radios are capable of establishing a simplex or half-duplex communication link with the remote host. In the network 200 of FIG. 2, the remote host has a wireline or wireless link to the remainder of the network 200. Communication in the network 200 is effected using internet protocol (IP). This is true for both radio and wireline communications. Thus, devices in the network 200 may use both IP unicast and IP multicast communication where appropriate.

The routers 204 include a router 222, router 224, router 226 and router 228. The routers 204 may be of conventional design or may be specialized devices. Each router 204 functions to receive packets of IP data and, in turn, convey or replicate packets to a next device in the network 200 according to the packet address.

The dispatch call server 206 implements certain dispatch call functionality in the network 200 as described herein. The structure and operation of the dispatch call server will be described in further detail in conjunction with FIG. 3 below. In particular, the dispatch call server 206 implements group call functionality on the network 200 to serve as coordinator and arbitrator for dispatch group calls. Participants in a group call transmit IP voice packets to the server in unicast fashion from the hosts 202. The hosts 202 are configured to receive unicast and multicast packets. The dispatch call server 206 receives voice packets from multiple sources. The server 206 chooses which packets to pass on to the group via IP multicast. The selection is based on a prioritization method and includes considerations such as time of arrival, predefined priorities or past history. Further, the selection by the server 206 may also be weighted in order to give fair access to participants in the call. An accept control signal can be sent to the chosen transmitting party and a busy control signal can be sent to a blocked transmitting party as a separate IP datagram.

As an example, in FIG. 2, the host 210 is engaged in a group call with hosts 212, 214, 216, 218, 220. Communication may be by radio transmission or by wireline communication.

During the group call, the host 210 sends a transmission 230 to the router 222. The transmission 230 is in unicast format and includes data representative of speech. It may also include control information identifying a dispatch group. Alternatively, the message may contain only control information and the host refrains from sending speech data until it has received an accept message from the server. The transmission 230 may include one or more packets of data and is arranged according to internet protocol. The router 222, in conventional fashion, identifies the destination of the transmission 230 using the address of the message contained in the transmission 230. In this case, the destination address corresponds to the IP address of the dispatch call server 206. The router 222 routes the transmission 230 to the dispatch call server 206 in a second transmission 232. Transmission 232 is also in unicast format.

It should be noted that, while only a single router 222 is shown in the path between the host 210 and the dispatch call server 206, in other embodiments of the network 200, more or fewer routers may be located in the path. Communication of the message in the transmission 230 from the host 210 to the dispatch call server 206 is preferably fully in accordance with internet protocol.

At the dispatch call server 206, the transmission 232 containing the message from the host 210 is received from the router 222. Control information within the message causes the dispatch call server 206 to broadcast a message to members of the group intended for receipt of the message. Preferably, IP multicast format is used. Thus, the dispatch call server 206 sends a message 234 to router 224 for multicast transmission to host 212 and host 214. Further, the dispatch call server 206 sends a message 236 to router 228 for multicast transmission to host 218 and host 220.

In this manner, voice communication originating at the host 210 is conveyed to host 212, host 214, host 218 and host 220. Data is transmitted using internet protocol.

The dispatch call server 206 controls communication among members of the group. While the talker at the host 210 is speaking or otherwise transmitting data, the dispatch call server 206 prevents other talkers in the group on the network 200 from transmitting. Thus, if a talker at the host 216 tries to transmit a transmission 238 to router 226, which in turn conveys a transmission 240 to the dispatch call server 206, the dispatch call server 206 returns a busy control signal 242 to the router 226. The router 226 conveys the control signal in a transmission 244 to the host 216. This provides an audible, visual or other indication to the talker at the host 216 that the transmission has been temporarily blocked. As a result, the dispatch call server would discard the message 240. Alternatively, when the talker at the host 210 finishes speaking, the dispatch call server 206 responds to the message 240 and conveys the subsequent message to the intended receiver or receivers. In yet another alternative, after the talker at the host 210 finishes speaking, the dispatch call server 206 sends an accept message to the blocked host 216. In response, the host 216 can begin the communication process.

Further, the dispatch call server 206 preferably implements a prioritization scheme for selecting which transmission is conveyed to the remainder of the group. The prioritization may be assigned in any convenient fashion. For example, a particular radio 202 having a particular IP address may be assigned a particular priority, such as highest priority in the group. Transmissions from that radio will be given priority over other transmissions from other radios in the event of a conflict.

Still further, the dispatch call server 206 preferably implements an aspect of fairness to the network 200. Because of the distributed and connectionless nature of internet protocol communication, the time duration for any message to travel through the network 200 is variable. To some extent, the time duration depends on the number of routers or router hops between transmitter and intended receiver as well as link speed or latency. To another extent, the time duration depends on network traffic. Because of this variability, unfairness may result if a transmitter having a relatively fast connection with the dispatch call server 206 is given the same priority over another transmitter having a longer transmission distance from the dispatch call server 206. The nearer or faster host will always get the channel to talk because messages from that host will get to the dispatch call server 206 faster than messages from a distant or slower host.

To provide this fairness, the dispatch call server 206 may detect the round trip data communication time between the server 206 and one or more members of the group involved in a group call. The priorities given to transmissions from each transmitter may then be weighted according to this round trip time. Then, upon receiving a transmission, the server would wait a specified time interval, corresponding to a specified maximum delay, to see if any delayed simultaneous transmissions take place and would then arbitrate the calls after analyzing the different delays. As used herein, arbitration is selecting one communication of many contending requests based on some factors, such as normalized transmission delays, preassigned priorities, and so forth. It is known to determine round trip time using the ping function of the internet protocol.

Multicast groups may be formed for group call purposes through appropriate signalling over the network 200. To receive a multicast transmission, at least one host on a subnet must first inform the network 200 of its need to join a particular multicast group, identified by a multicast address. The Internet Group Management Protocol (IGMP) may be used by a host 202 to signal membership to its local router. IGMP is also used to signal membership information between the local router and others in the network, via periodic routing update inquiries. According to one embodiment, IP dispatch enabled hosts would first register themselves with the server, and obtain the multicast address for the group. The host would then follow IGMP procedures to establish multicast group membership. Group calls could then be made using this address. After a certain time, if no group call activity occurs, the address may be released, and a new one established before further group call activity is undertaken. The server would inform registered hosts of any change in multicast addresses.

The network 200 uses native multicast operation on networks having this assumed capability, as this is the most efficient means for point to multi-point communication. However, the dispatch IP server concept also extends readily to non-multicast networks. In that case, the point to multi-point operation of the server relaying the group call packets would be done via unicast transmission to all group members from the server, and the server would act as a packet replicator. The dispatch IP server may also be used in cases where only a limited number of multicast routers exist, and multicast packets are tunneled between them over standard non-multicast networks as is known in the art. In this case, the server acts as one multicast router, and tunnels the group call packets to other multicast routers as required.

Figure 3:
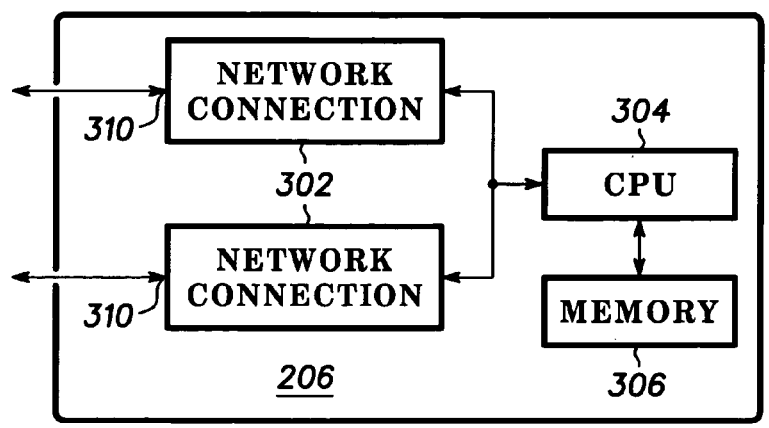
FIG. 3 is a block diagram of a dispatch call server of the network of FIG. 2.

FIG. 3 is a block diagram of a dispatch call server 206 of the network 200 of FIG. 2. The dispatch call server 206 in the embodiment of FIG. 3 includes one or more network connections 302, a central processing unit 304 and memory 306. Each network connection 302 includes a port 310 configured for connection to the network 200 (FIG. 2). The port 310 provides two-way data communication between the dispatch call server 206 and the network. Each network connection 302 provides the necessary data formatting and timing operations for reliable data communication over the network 200. Each network connection 302 is coupled with the CPU 304. The CPU 304 controls the operation of the dispatch call server 206. The CPU operates in conjunction with data and instructions stored in the memory 306. Thus, the functionality described herein for the dispatch call server 206 may be implemented in software stored in the memory 306 for controlling the CPU 304 and other elements of the dispatch call server 206.

The dispatch call server 206 may be implemented as a conventional router with specialized instructions for performing the dispatch call server operation. Alternatively, the dispatch call server 206 could be a personal computer or other data processing system having network connection cards forming the network connections 302. Again, customized software is provided for providing the necessary dispatch call server functionality. The dispatch call server 206 is essentially a processor with network connections. The network connections may be in accordance with ETHER-NET® asynchronous transfer mode (ATM) or other data communication protocol. The dispatch call server 206 routes calls through itself to provide group call functionality in a packet based dispatch radio network.

Figure 4:
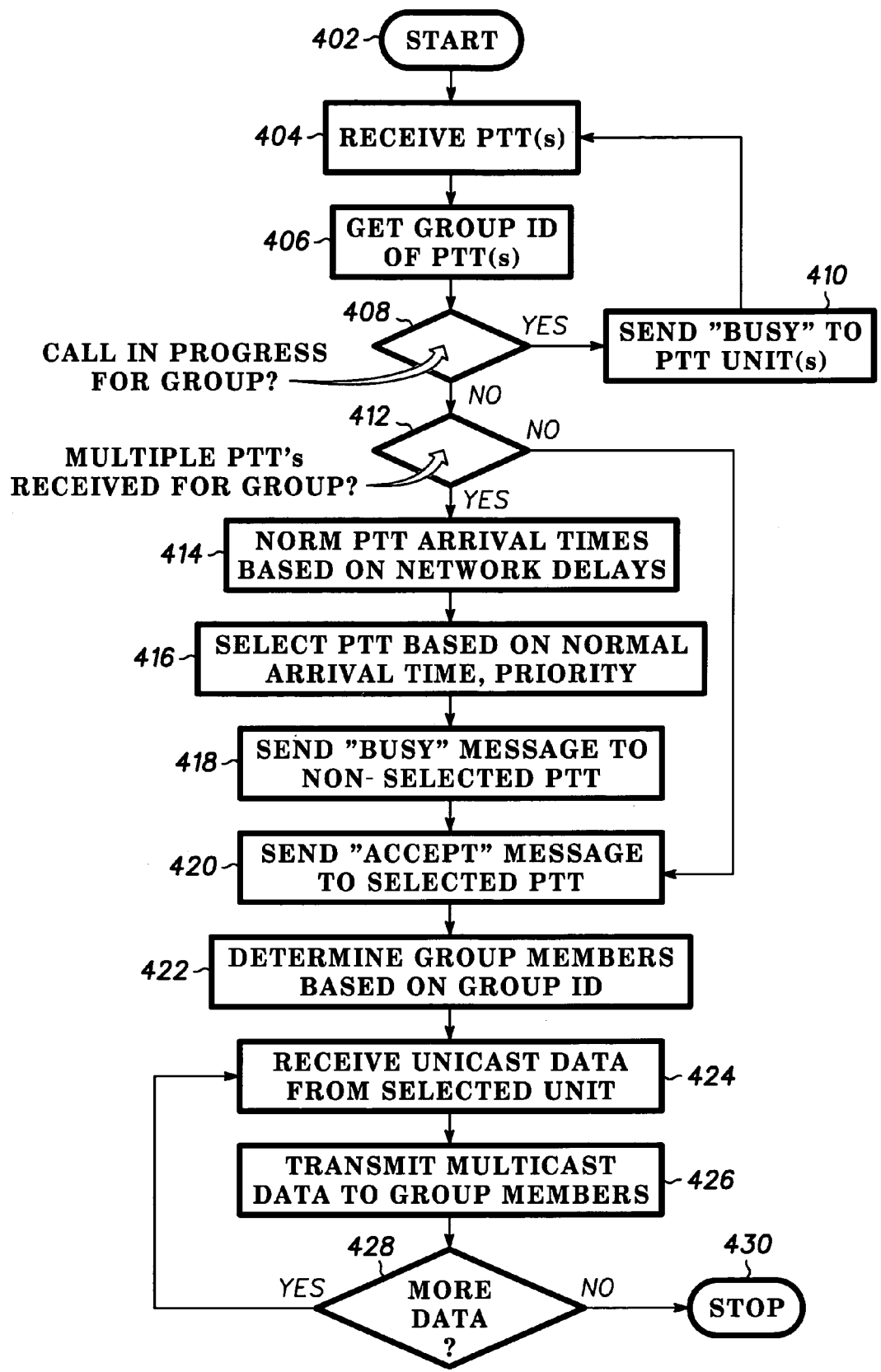
FIG. 4 is a flow diagram illustrating one embodiment of a method of operating the network of FIG. 2.

FIG. 4 is a flow diagram illustrating a method of operating the network 200 of FIG. 2. In particular, the blocks forming the flow diagram of FIG. 4 may be performed by the dispatch call server 206 of the network 200 of FIG. 2. In the method embodied in FIG. 4, the dispatch call server initially arbitrates conflicting call requests then conveys data from the selected caller to the remainder of a group. The method of FIG. 4 begins at block 402.

At block 404, the server receives one or more requests to communicate from a host in the network. The requests are designated as push-to-talk-(PTT) requests in accordance with the one-way nature of dispatch communication. Depending on system timing and caller demands, more than one request may be received at approximately the same time. Each request is an attempt by a host in the network to be granted a channel for communication. The request is preferably received in an IP unicast format, but any suitable transmission may be accommodated by the network.

At block 406, the server gets the group identifier associated with the PTT requests. The group identifier is associated with two or more hosts which may communicate among themselves. The group in one embodiment is stored in a database at the dispatch call server, but may be located at any place or places accessible to the server on the network.

At block 408, the dispatch call server determines if there is a call in progress for the requested group. A call corresponds to another talker in the same group who currently is transmitting data for the group. If there is a call in progress, at block 410 at control signal is sent to the requesting host to indicate the busy condition. The control signal is preferably sent in an IP unicast format, but other formats may be used as well. In addition, the server may wait a predetermined time for the busy condition to end so the request can be accepted. Further, the requesting host may respond to the busy control signal by waiting a predetermined time be for re-sending the request.

If no call is in progress at block 408, at block 412 the server determines if multiple requests have been received for the group. If not, control proceeds to block 420. If so, the server must first arbitrate between the calls before selecting one to proceed. At block 414, the dispatch call server normalizes the arrival times for the multiple PTT requests. Normalization is based on the respective network delays experienced by each request. This information may be determined in any suitable manner for each request, such as using the ping function or by counting router hops experienced by each request. In addition, other priorities are evaluated. For example, if the network implements a police communication network, the host associated with the chief of police may be given priority over other communications.

At block 416, a PTT request is selected based on the normalized arrival time and any other priority defined for the network. At block 418, a control signal is sent to the host or hosts which were not selected at block 416. At block 420, an accept control signal is sent to the host which was selected for communication, indicating that the host has been accepted and a call may proceed. These control signals are preferably sent using IP unicast format. At block 422, the server determines the identity of other group members to receive the communication. This determination is preferably based on the group identifier determined at block 406. The group may include one or many additional members.

The group call server then enters a loop including block 424, block 426 and block 428 for conveying the call from the originating host to other members of the group. At step 424, the server receives data from the originating host. The data may be data representative of speech or other data. Preferably, the data are received in an IP unicast format sent for the originating host to server by specifying the IP address of the server. In response to the received data, the server transmits data to the group members determined at block 422. Preferably, this is done using IP multicast to a multicast address shared by the group members. At block 428, the server determines if there is more data to be received and transmitted. This may be accomplished by sending an end of message signal at the host to indicated the host has completed transmission of the message. If so, control returns to block 424. If not, control proceeds to block 430 and the method ends.

Figure 5:
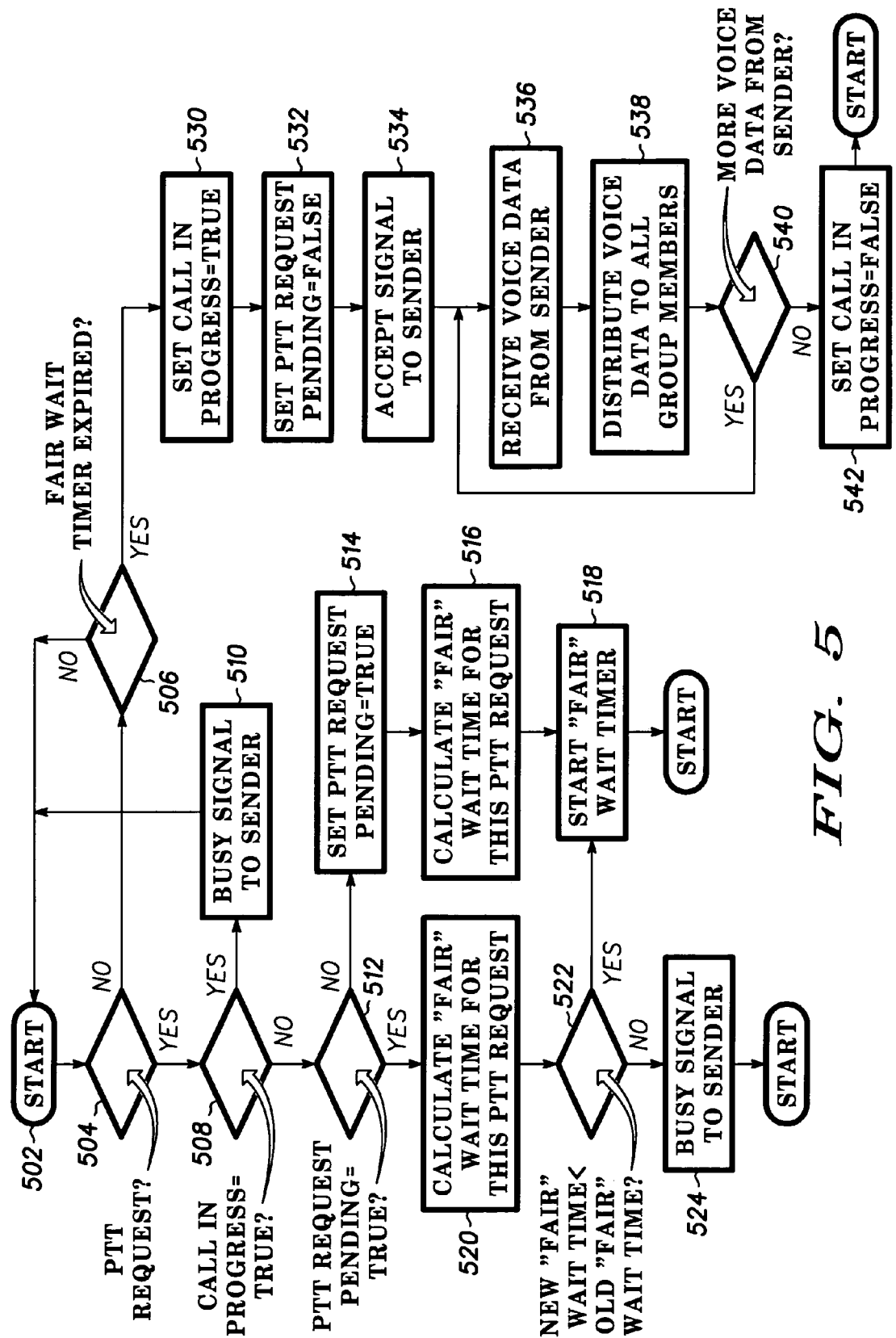
FIG. 5 is a flow diagram illustrating a second embodiment of a method of operating the network of FIG. 2.

FIG. 5 illustrates a second embodiment of a method for operating the dispatch call server in the network of FIG. 2. In the method of FIG. 5, the dispatch call server implements a fair wait timer to ensure fairness of call acceptance among hosts transmitting PTT requests. The fair wait timer times the elapse of a fair wait time for a respective host. If the fair wait timer expires without receipt of another PTT request, the server is assured that no request has been delayed in the network and should be accommodated first. The fair wait timer may be implemented in hardware or software or by any suitable combination. The method begins at block 502.

At block 504, the host determines if it has received a PTT request. As in FIG. 4, each request is an attempt by a host in the network to be granted a channel for communication. The request is preferably received in an IP unicast format. If no request is received, the server proceeds to block 506 to determine if the fair wait timer has expired. If the fair wait timer has not expired, the server returns to block 502.

At block 504, if a request was received, at step 508, the server determines if a call is currently in progress for the group. As indicated in FIG. 5, this may be done by reading the logical state of a flag stored in memory at the server. If a call is in progress, at block 510 a control signal indicating the busy condition is send to the requesting host. If no call is currently in progress, the server determines if it currently has a PTT request pending at block 512. The pending request is one which has been previously received but which is awaiting elapse of its fair wait timer for fulfillment. At block 520, the server determines the fair wait time for the new PTT request. This may be done in any suitable manner. At block 522, the fair wait times for the newly received PTT request and the pending request are compared. If the new wait time is less than the old wait time, the new call will be the next call to be accepted. Control passes to block 518 where the fair wait timer is started using the fair wait time calculated at block 520 for the newly received PTT request. If the new wait time is not less than the old wait time, at block 524 a control signal is sent in IP unicast format to the requester to indicate the busy condition.

If, at block 512, there was no pending PTT request, at block 514 the request pending flag is set to true. At block 516, the fair wait time for the PTT request is determined and at block 518 the fair wait time is started. Control then returns to block 502 to wait for another PTT request (block 504) or elapse of the fair wait timer (block 506).

When the dispatch call server determines that the fair wait timer has expired at block 506, control then proceeds to block 530 to process the incoming PTT request. At block 530, a call in progress flag is set to true to indicate for future requests that a call is in progress. At block 532, the PTT request pending flag set for this PTT request is cleared. At block 534, an accept signal is sent to the host which originated the PTT request. The accept signal indicates that the call request from the host has been accepted and a call may proceed. This control signal is preferably sent using IP unicast format.

At blocks 536, 538 and 540, the server enters a loop for processing the call to completion. At block 536, data representative of speech or other data are received from the host. At block 538, in response to the received data, multicast data are sent to all group members. The data is preferably sent using IP multicast format by sending the data to the multicast address assigned to the group. At block 540, the server determines if there is more data pending from the sender. In one example, this is done by detecting presence of an end of message signal transmitted by the sender. If there is more data, control returns to block 536. If not, and the call is ended, at block 542 the call in progress flag is cleared. Control then returns to block 502 to await a next request.

From the foregoing, it can be seen that the present embodiments provide a method and apparatus for coordinating dispatch calls in a packet-based network such as a dispatch radio network. Pre-existing and widely recognized internet protocol techniques are used to convey data in the network. For controlling group calls, a dispatch call server is introduced to the network. The dispatch call server receives transmissions from hosts within the network using internet protocol. In a group call, a unicast transmission from the talker is translated to a multicast transmission to all other members of the group. The dispatch call server arbitrates between contending transmissions that occur during the same time frame to ensure that data is reliably and coherently received at each receiver in the group on the network. The dispatch call server implements fairness by ensuring that both local and remote transmitters have equal or appropriate access to group call transmissions. While this invention is described in the context of voice dispatch communications systems, the techniques described herein are also applicable to other well known real-time data communications, such as video or interactive whiteboard applications.

While a particular embodiment of the present invention has been shown and described, modifications may be made. For example, the functionality provided by the dispatch call server may be distributed over several devices on the network. It is therefore intended in the appended claims to cover such changes and modifications which follow in the true spirit and scope of the invention.

What is claimed is:

1. A dispatch communication network comprising:
a group of hosts of a plurality of communication hosts wherein only one host of the group at a time is allowed to transmit internet protocol (IP) communications comprising voice communications to the other hosts of the group; and
a dispatch call server configured to arbitrate IP communication among the group, wherein arbitrating comprises selecting one transmitting host, from a plurality of competing hosts from which the dispatch call server receives request transmissions, that is allowed to transmit the IP communications to the other hosts of the group after a preceding transmitting host of the group of hosts has completed its transmission, wherein the dispatch call server is configured to arbitrate communication among the group of hosts based on a number of factors comprising estimated request times, which are based on arrival times of the request transmissions and an estimated network delay corresponding to each of the request transmissions.

2. The dispatch communication network of claim 1 wherein the dispatch call server is configured to receive dispatch communication data from one or more hosts of the group of hosts and to transmit the dispatch communication data to one or more destinations over an IP network.

3. The dispatch communication network of claim 2 wherein the dispatch communication data comprises data representative of speech.

4. The dispatch communication network of claim 2 wherein the dispatch call server is configured to receive unicast IP transmissions from the one or more hosts.

5. The dispatch communication network of claim 2 wherein the dispatch call server is configured to transmit the dispatch communication data in an IP multicast format.

6. The dispatch communication network of claim 2 wherein the dispatch call server is configured to transmit the dispatch communication data in an IP unicast format.

7. The dispatch communication network of claim 1 wherein the dispatch call server is configured to receive a transmission from one or more transmitting hosts and transmit to one or more receiving hosts.

8. The dispatch communication network of claim 7 wherein the dispatch call server is configured to arbitrate communication among the group of hosts based on priorities assigned to the one or more transmitting hosts.

9. The dispatch communication network of claim 7 wherein the dispatch call server is configured to select one transmitting host for communication and to convey a busy control signal to other hosts of the transmitting hosts.

10. A method of operating a dispatch communication network, the method comprising:
at a dispatch call server, receiving internet protocol (IP) messages including dispatch call data from a plurality of competing hosts over a packet network wherein ly one host at a time is allowed to transmit IP messages comprising voice communications to the other hosts of the network,
at the dispatch call server, arbitrating the IP messages originating from the plurality of competing hosts, wherein arbitrating comprises selecting one transmitting host, from the plurality of competing hosts, that is allowed to transmit the IP messages comprising voice communications to the other hosts of the network after a preceding transmitting host has completed its transmission and wherein arbitrating the IP messages comprises selecting one transmitting host based on a number of factors comprising estimated transmit times which are based on arrival times of the IP messages and an estimated network delay corresponding to each of the IP messages; and
from the dispatch call server, transmitting the dispatch call data in an IP transmission to the one or more destinations over the packet network.

11. The method of claim 10 wherein the estimated transmit times are based on a host's round trip time.

12. The method of claim 10 wherein the step of arbitrating comprises:
selecting a transmitting host for communication to the one or more destinations based on priorities assigned to the one or more competing hosts.

13. The method of claim 10 further comprising:
selecting one transmitting host for communication; and
transmitting a busy control signal to the other competing hosts.

14. The method of claim 10 further comprising:
selecting one transmitting host for communications; and discarding the dispatch call data from the other competing hosts.

15. The method of claim 10 further comprising:

selecting one transmitting host for communications; and when the transmitting host completes communications, selecting one of the other competing hosts for communications.

16. A method of operating a server in a dispatch communication network, the method comprising:

receiving a request comprising voice communications to communicate from one host on the network;

determining if another request to communicate has been received from another host on the network and if another request to communicate has been received then arbitrating the requests so that the arbitrated request is transmitted to one or more receiving hosts wherein only one host at a time is allowed to transmit communications to the other hosts after a preceding transmitting host has completed its transmission;

selecting a transmitting host for communication based on a number of factors comprising estimated request times, which are based on arrival times of the requests and an estimated network delay corresponding to each of the requests;

receiving dispatch data from the selected host; and transmitting the dispatch data to the one or more receiving hosts.

17. The method of claim 16 further comprising:

determining a first wait time for communication from the one host;

waiting a time at least equal to the first wait time; and after the first wait time, accepting transmissions from the one host.

18. The method of claim 17 further comprising:

determining if a call is in progress;

if a call is in progress; sending a busy control signal to the one host.

19. The method of claim 16 further comprising:

determining if there is a pending request to communicate;

if not, determining a wait time for the request; and after the wait time has elapsed, receiving the dispatch data from the selected host.

* * * * *